May 13, 1969 SVEN CARL-JOHAN HOLMSTRÖM ET AL 3,443,774
REMOTE CONTROLLED SPINNING MISSILE SYSTEM
Filed Feb. 14, 1968 Sheet 2 of 2
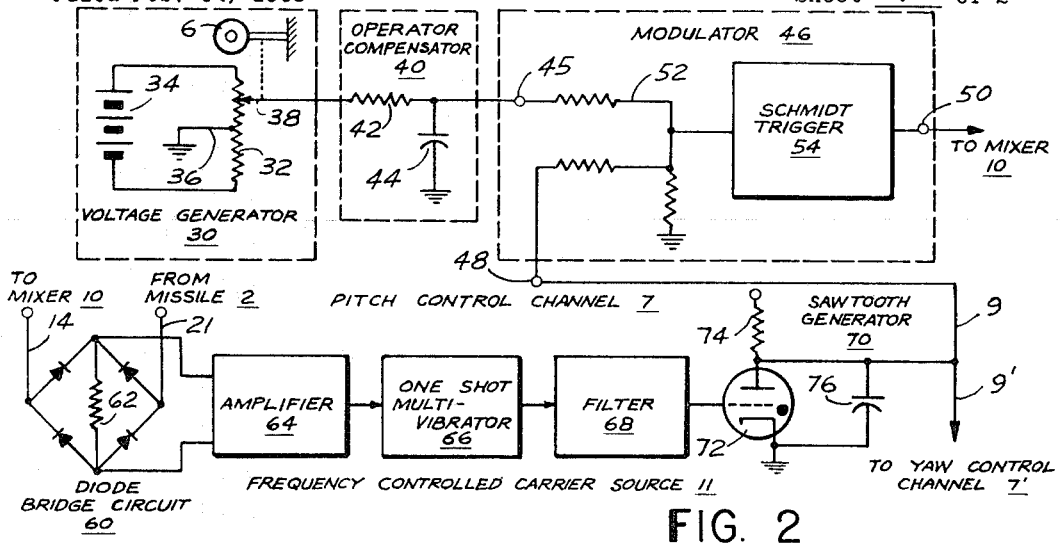
FIG. 2
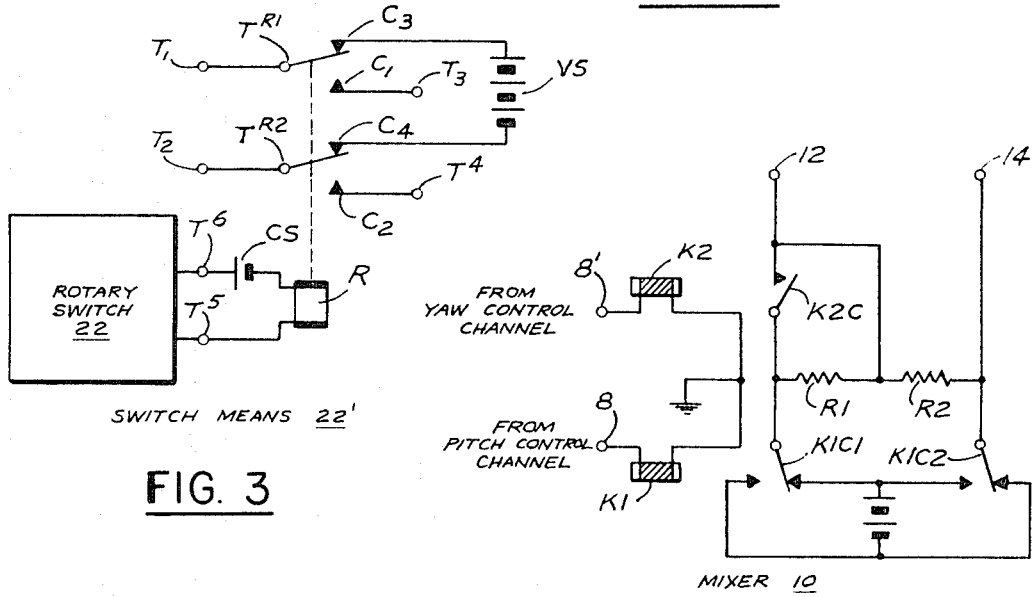
FIG. 3
FIG. 4
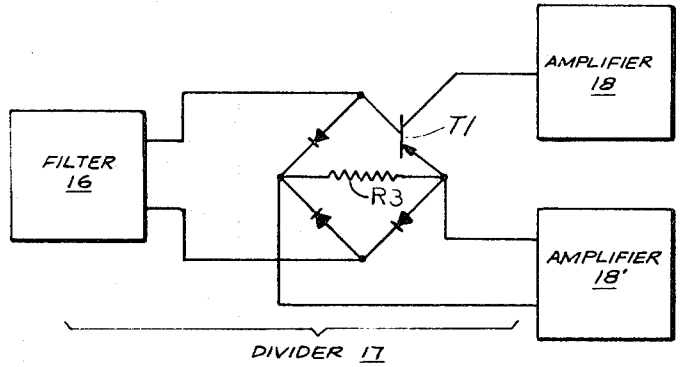
FIG. 5
INVENTORS
SVEN CARL-JOHAN HOLMSTRÖM
PER-ERIK NILSSON
TORE BERTIL REINHOLD OLSSON
BY
Hane and Baxley
ATTORNEYS United States Patent Office 3,443,774
Patented May 13, 1969

3,443,774
REMOTE CONTROLLED SPINNING
MISSILE SYSTEM
Sven Carl-Johan Holmström, Bofors, and Per-Erik Nilsson and Tore Bertil Reinhold Olsson, Karlskoga, Sweden, assignors to Aktiebolaget Bofors, Bofors, Sweden, a Swedish company
Continuation-in-part of application Ser. No. 574,434, Aug. 23, 1966. This application Feb. 14, 1968, Ser. No. 705,527
Claims priority, application Sweden, Oct. 20, 1962, 11,269/62
Int. Cl. F42b 15/04; F41g 7/02
U.S. Cl. 244—3.12                4 Claims

ABSTRACT OF THE DISCLOSURE

In a wire-guided missile system the trajectory of the missile is controlled by signal operated spoilers. The spoilers operate in response to repetitive control signals received over wires from a ground controller. The ground controller receives signals from the missile indicating its angular velocity about the spin axis. These signals are used to establish the frequency of the repetitive control signals.

---

The present application is a continuation-in-part application of our copending continuation-in-part application Ser. No. 574,434, filed Aug. 23, 1966, now abandoned, which, in turn, is a continuation-in-part of our application Ser. No. 317,356, filed Oct. 18, 1963 for Electrically Operated Follow-up System, now abandoned.

The present invention relates to a follow-up system for remote control of a movable member from a stationary control member. More particularly, the invention relates to a remote control follow-up system in which the stationary control or pilot member includes a transmitter and the controlled or following movable member includes a receiver connected to the transmitter by wires and actuating control elements to perform a desired control function on the movable member.

A preferred, though not exclusive, field of application for a follow-up system of the general kind above referred to are wire-guided missiles, which when in flight perform a spinning motion and are controlled by manually operated ground apparatus. Missiles of this kind are generally equipped with two pairs of spoilers symmetrically mounted in two planes disposed at right angles in reference to each other and intersecting in the longitudinal axis of the missile. Such spoilers then constitute the aforementioned control elements actuated by the receiver of the follow-up system.

On missiles of this kind the angular positions of each pair of spoilers in reference to the perpendicular is measured by means of a commutator mounted on an arbor of the gyro of the missile for rotation in unison therewith. The receiver distributes signals generated by the transmitter and fed to the receiver upon the spoilers so that during a first quarter spin of the missile a vertical command signal is directed to one pair of spoilers and a lateral command signal to the other pair of spoilers, and during the second quarter spin a lateral command signal is fed to the first-mentioned pair of spoilers and a vertical command signal to the second-mentioned pair, etc. Such changeover in signals occurs each time the pair of spoilers passes through a plane defining a 45° angle with the perpendicular. The spoilers are movable at right angles in reference to the lengthwise median plane of the missile and have two limit positions between which they move with a frequency controlled by signals from the transmitter in the ground apparatus. The desired guidance of the trajectory of the missile is obtained by controlling the periods of time during which the pairs of spoilers occupy one or the other of the limit positions.

Tests and calculations have shown that an accurate guidance of the missile is difficult to effect within certain ranges of the ratio between the frequency of the spoiler movements and the rate of spin i.e., angular velocity about the spin axis of the missile.

The rate of spin or angular velocity of a missile about its longitudinal axis is affected by several factors which are not under the control of the ground crew, once the missile is launched. Such random variations in the rate of spin are, for instance, due to the influence of wind and temperature upon a missile in flight and also due to the tolerances used in the manufacture of the missiles. Accordingly, when the frequency of the spoiler movements is kept constant, as it is effected by follow-up systems as heretofore known, a certain percentage of missiles will operate within an unfavorable ratio between the frequency of the spoilers' movements and the rate of spin of the missile and thus may miss the target.

It is a broad object of the present invention to provide a novel and improved follow-up system of the general kind above referred to which includes means for automatically compensating for random variations of a physical magnitude affecting the movements of the movable component of the system.

A more specific object of the invention is to provide a novel and improved follow-up system for controlling the trajectory of a spinning wire-guided missile, which system includes means automatically compensating for random variations in the rate of spin of the missile.

The aforementioned objects, features and advantages and other objects, features and advantages which will be pointed out hereinafter are attained according to the invention by providing on the movable component of the follow-up system, such as a missile, switch means which are responsive to random variations of a physical magnitude of the component, such as random variations of the rate of spin of the missile, and which in turn control the transmission of return signals from the movable component to the stationary component of the system. These signals are then used to indicate the random variations, or to initiate corrective action to compensate for the effect of the random variations upon the movements of the movable component of the system.

In the accompanying drawing several preferred embodiments of the invention are shown by way of illustration, and not by way of limitation.

In the drawing:

FIG. 2 is a schematic diagram of the pitch control channel and the frequency-controlled carrier source of the stationary control apparatus of FIG. 1;

FIG. 3 is a circuit diagram of a modification of the follow-up system;

FIG. 4 is a schematic diagram of a mixer; and

FIG. 5 is a schematic diagram of a divider.

Figure 1:
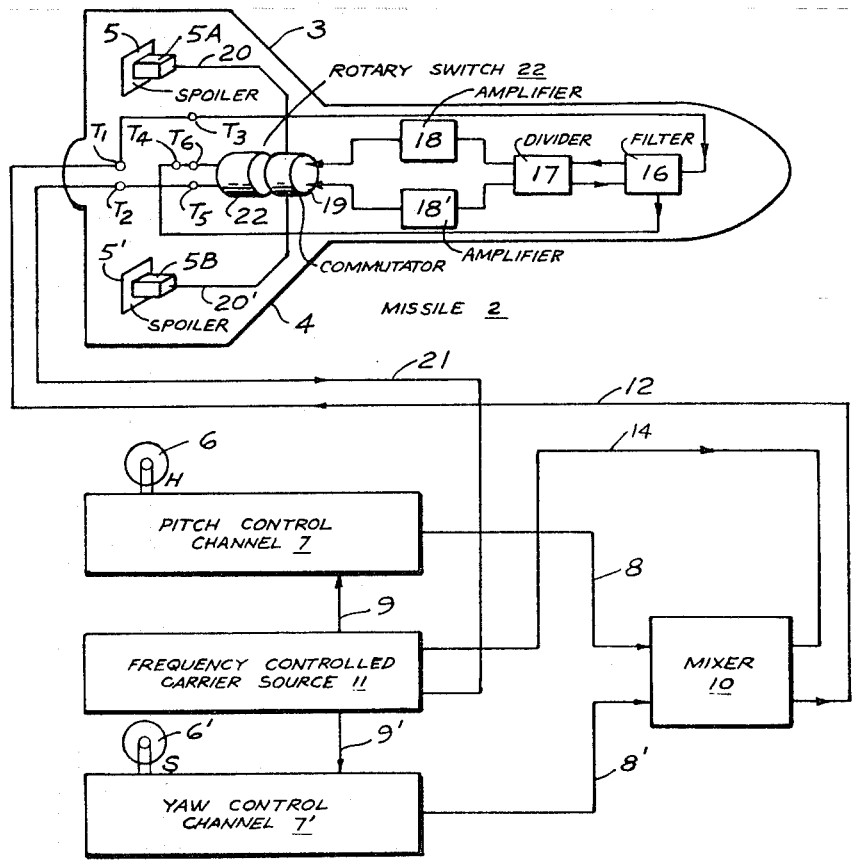
FIG. 1 shows diagrammatically a follow-up system according to the invention applied to a wire-guided missile.

Referring first to FIG. 1 in detail, this figure shows a stationary control apparatus generally located on the ground and manually serviced by the ground crew, and a missile 2. The missile should be visualized as being of conventional design in respect to its explosive charge and the means for detonating such charge. The means for launching or firing the missile should also be visualized as being of conventional design. They are not essential for the understanding of the invention and hence are not illustrated or described.

The missile is equipped with four wings or fins which are symmetrically mounted on the missile body and disposed in two planes meeting at right angles and intersecting at the longitudinal center axis of the missile. Wings or fins 3 and 4 in one plane are shown. A spoiler, also of conventional design, is mounted on each wing or fin. One pair of spoilers 5 and 5' is diagrammatically shown mounted on fins 3 and 4. As previously explained, the spoilers are movable at right angles in reference to the lengthwise axis of the missile and move between two limit positions. The mounting of the spoilers and the specific configuration thereof do not constitute part of the invention. They should be visualized as being conventional and hence are not described in detail.

As previously explained, the trajectory of the missile is controlled by moving the spoilers into one or the other of the limit positions thereof, and such control of the spoiler movement is effected at the ground station by stationary control apparatus 1. More specifically, the spoiler positions are controlled by means of two hand wheels or knobs 6 and 6'. In the exemplified embodiment of the invention, knob 6 is used to effect vertical or height guidance of the missile, as is indicated by the letter H next to the knob, and the knob 6' is used to effect lateral or sidewise guidance, as is indicated by the letter S. Both knobs may be turned from a zero position through an angle selected by the operator to effect height or sidewise control of the missile to an extent deemed necessary by him. The zero position signifies that the missile is on course, and any angular departure from the zero position causes a change in the trajectory of the missile by moving the spoilers of one or the other pair.

Knob 6 controls pitch control channel 7, which transmits pulse-width-modulated signals via line 8 to mixer 10. The width of the pulses is dependent on the angular deviation of knob 6 from a zero position. At the zero position, the pulses have a 50% duty cycle. But the duty cycle will be more or less in accordance with the direction of angular deviation of knob 6. It should be noted that within each pulse period the waveform can be considered as two half-waves, one positive going and the other negative going. The frequency of the pulses is determined by a signal on line 9 from frequency-controlled carrier source 11. Knob 6' controls yaw control channel 7' in a similar manner to produce similar pulses that are fed via line 8' to the second input of mixer 10. Mixer 10 mixes the signals received from lines 8 and 8' to generate output signals whose amplitude and polarity are controlled by the received input signals. The mixer 10 is connected via line 12 to missile 2, and via line 14 to frequency-controlled carrier source 11. The signals on line 12 are fed via terminals T1 and T3 in missile 2 to filter network 16.

Filter network 16 feeds the signal transmitted to the missile to a divider unit 17 which divides the composite output signal of mixer 10 into its components, namely, the output signal of channel 7 and the output signal of channel 7'. The signal of channel 7 is fed to an amplifier 18, and similarly, the signal of channel 7' is fed to an amplifier 18'. The output signals of amplifiers 18 and 18' are transmitted to a commutator 19. This commutator is connected by conductors 20 and 20', respectively, to the moving mechanisms 5a and 5b, respectively, of the spoilers 5 and 5' so that the signals are alternately fed to the spoilers in the manner described in the introduction of the specification.

The control signals on line 12 are also fed via terminals T1 and T3, filter 16, terminals T4 and T6, rotary switch 22, terminals T5 and T2, and wire 21 from source 11. Thus, frequency-controlled carrier source 11 receives the control signals via missile 2. Rotary switch 22 is basically a single-pole single-throw switch which switches between open and closed states at least once per revolution of the missile. When the switch is open, no current will flow through the resistance 62 of diode bridge circuit 60. When the switch is closed, current flows through wire 21 to resistance 62 of diode bridge, circuit 60 and lead 14 to mixer 10. Amplifier 64 senses the voltage across resistance 62 and compares the voltage with a reference voltage. When the voltage across resistance 62 is less than the reference voltage the amplifier generates a pulse. This is the case each time the switch 22 is open. Therefore, a pulse is generated at least once per revolution of the rotary switch 22. These pulses are directly related to the spinning frequency of the missile. These pulses are processed in carrier source 11 to provide carrier signals via lines 9 and 9' to the channels 7 and 7' so that the pulse-width-modulated pulses fed along lines 8 and 8' to the mixer have a frequency of repetition rate directly related to the spinning frequency of the missile.

The details of pitch control channel 7 and the frequency-controlled carrier source are shown in FIG. 2. In particular, channel 7 comprises a voltage generator 30 which generates a voltage directly dependent upon the angular position of the knob 6 in reference to a zero position. The voltage generator can be a potentiometer whose resistance 32 is connected across a source of voltage 34.

The center of the resistance 32 is connected via line 36 to ground. The slider 38 of the potentiometer is mechanically connected to knob 6. Thus, as knob 6 moves slider 38, its voltage output is variable, positive or negative, with respect to ground. The output of voltage generator 30 (the slider 38) is connected to an operator compensator 40 which serves to smooth out an overcontrol or overcompensation due to the human reaction characteristic of the operator. The compensator 40 can be an integrator comprising resistor 42 and capacitor 44. The output of compensator 40 (the junction of resistor 42 and capacitor 44) is connected to the modulating input 45 of modulator 46, which receives a recurring sawtooth voltage at carrier input 48.

Modulator 46 transmits from its output terminal 50 a pulse having a width proportional to the magnitude of the voltage received at terminal 45 for each cycle of the sawtooth voltage received at terminal 48. The modulator 46 can be a resistance voltage adder network 52 whose output is connected to the input of Schmidt trigger 54. The trigger is turned on when the voltage at its input exceeds a given value and is turned off when the voltage falls below a given value. If the sawtooth voltage has a very abrupt trailing edge, the trigger will always turn off at the same time in each of the sawtooth cycles. When the sawtooth voltage has a gradually rising leading edge, the trigger turn-off becomes a function of the magnitude of the modulating voltage received at terminal 45.

The sawtooth voltage generated by frequency-controlled carrier source 11 has a frequency of a repetition rate related to the frequency of the spin of the missile. In particular, source 11 comprises an amplifier 64 which generates a pulse each time the rotary switch 22 opens.

The amplifier 64 compares the voltage across resistance 62 with a reference voltage and generates a pulse whenever the voltage across the resistance 62 is less than the reference voltage. This pulse is fed to one-shot multivibrator 66.

Multivibrator 66 transmits a pulse of uniform amplitude and duration for each pulse it receives. The output of multivibrator 66 is filtered by filter 68, which transmits a voltage whose amplitude is a function only of the frequency of the received pulses. The output of filter 68 is fed to a free-running sawtooth generator 70, whose frequency is controlled by the amplitude of the received signal.

Sawtooth generator 70 can be a thyratron 72 whose grid is connected to the output of filter 68 so that the voltage therefrom controls the firing potential of the thyratron. The plate of the thyratron is connected via a charging resistor 74 to a voltage source V and via a capacitor 76 to ground. The sawtooth voltage is transmitted from the junction of resistor 74 and capacitor 76 via the lines 9 and 9' to channels 7 and 7'.

Since yaw control channel 7' is similar to pitch control channel 7, it will not be described.

The commutator 19 and the rotary switch 22 are well known in the art. They can be of the type shown in FIG. 7 and described in column 4, lines 59 ff., of Patent 3,090,582.

The mixer 10 can be of the type shown in FIG. 4. Although electronic switching can be used, its relay counterpart is shown for the sake of simplicity. The signals on line 8 from the pitch control channel operate relay K1 to determine the polarity between the lines 14 and 12. The signals on line 8' from the yaw control channel operate relay K2, which by shorting out resistor R1 determines the voltage amplitude difference between lines 12 and 14.

The divider 17 can be of the type shown in FIG. 5, utilizing a diode bridge. The current from filter 16 is rectified and develops a voltage, proportional to the current but independent of polarity, across resistor R3. This voltage is applied to amplifier 18', which controls the yaw spoilers. One bridge arm comprises the base-emitter junction of transistor T1. The transistor will conduct or not, depending on the direction of current from filter 16. The output of transistor T1 is applied to pitch control amplifier 18.

It is possible to increase the amplitude of the pulses sensed by the amplifier 64 by replacing rotary switch 22 by the switch means 22' of FIG. 3. The replacement is as follows: The line between terminals T1 and T3 and the line between terminals T4 and T6 as shown are removed; also the line between terminals T2 and T5. Then the coil of relay R is connected in series with current source CS across terminals T5 and T6. Therefore, the relay R is always energized except when rotary switch 22 is open. The first and second transfer contacts TR1 and TR2 of relay R are connected, respectively, to terminals T1 and T2. The normally open contacts C1 and C2 of relay R are, respectively, connected to terminals T3 and T4. Therefore, as long as relay R is energized, wires 12 and 21 are connected to the missile 2 in the usual manner to feed control signals to the spoiler actuators. The normally closed contacts C3 and C4 of relay R are connected to the output terminals of high voltage source VS. Therefore, whenever relay R is de-energized, a voltage pulse is developed across wires 21 and 12.

The circuit system of FIG. 3 may be modified by connecting only one of the terminals of high voltage source VS permanently to one of the wires 21 or 12. The connection of the other terminal is then controlled by relay R. As is evident, such an arrangement simplifies the contact assembly of the relay. It is also possible to replace the voltage source VS of FIG. 3 by a source of alternating voltage. In such a case, the single pulses are replaced by short pulse trains. Instead of using mechanical switch means, electronic switch means including transistors may also be used. The signals indicative of variations in the rate of spin of the missile as previously described may be fed directly to the ground station by the guiding wires.

The switch means may be made responsive to changes in a physical magnitude other than the rate of spin of a missile.

The various circuit components hereinbefore referred to in connection with the explanation of the circuit system according to FIGS. 1 through 3 should all be visualized as conventional circuit components well known in the art for the specific functions which are ascribed to the circuit components in the system in which they are used.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore to cover all such changes and modifications in the appended claims.

What is claimed is:

1. An electrically operated follow-up system for controlling a trajectory of a guided spinning missile from a ground station, said follow-up system comprising a stationary signal transmitter at the ground station and a signal receiver on the missile, signal transfer means connecting the transmitter and the receiver for transmitting repetitive control signals therebetween, trajectory control means on the missile controlled by the signals received in the receiver and controlling the trajectory of the missile, switch means on the missile controlled by the rate of spin thereof and connected in circuit with said signal transfer means to periodically vary the electrical conditions therein in accordance with the rate of spin of the missile, and compensating means at said ground station connected in circuit with said signal transfer means, said compensating means being controlled by the periodic variations of the electrical conditions in said signal transfer means for changing the frequency of the repetitive control signals to the receiver through said signal transfer means in response and corresponding to a random departure of the rate of spin of the missile from a predetermined rate of spin.

2. A follow-up system according to claim 1, wherein said transmitter comprises signal-generating means for transmitting signals to said receiver to actuate said control means periodically, the signals from said signal-generating means and the signals from said compensating means complementing each other to maintain a predetermined range of ratio between the frequency of the actuation of the trajectory control means and the rate of spin of the missile.

3. A follow-up system according to claim 1, wherein said signal transfer means is a wire means and said switch means cause a variation in the current flow through said wire means in accordance with the rate of spin of said missile.

4. A follow-up system according to claim 3 and comprising a source of current, said switch means connecting said source of current to the wire means at time intervals controlled by the rate of spin of said missile, connection of said source of current to the wire means activating said compensating means to transmit the aforesaid repetitive control signals to the receiver.

References Cited

UNITED STATES PATENTS

| 2,850,251 | 9/1958 | Joerndt | 244—3.13 |
| 2,852,208 | 9/1958 | Schlesman | 244—3.11 |
| 2,995,749 | 8/1961 | Robinson | 244—3.14 X |
| 3,090,582 | 5/1963 | Senger | 244—3.12 |
| 3,163,711 | 12/1964 | Schindler | 244—3.12 X |

RODNEY D. BENNETT, *Primary Examiner.*

MALCOLM F. HUBLER, *Assistant Examiner.*

U.S. Cl. X.R.

244—3.11